United States Patent
Itou

(10) Patent No.: US 8,582,066 B2
(45) Date of Patent: Nov. 12, 2013

(54) LIQUID CRYSTAL DISPLAY DEVICE HAVING A PLURALITY OF SLIP ELECTRODE PORTIONS WITH CURVED PORTIONS THAT ARE OVERLAPPED BY A PLURALITY OF OPENINGS

(75) Inventor: Osamu Itou, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 253 days.

(21) Appl. No.: 13/029,231

(22) Filed: Feb. 17, 2011

(65) Prior Publication Data
US 2011/0222009 A1 Sep. 15, 2011

(30) Foreign Application Priority Data

Mar. 11, 2010 (JP) ................................. 2010-054613

(51) Int. Cl.
*G02F 1/1343* (2006.01)
(52) U.S. Cl.
USPC ......................................................... 349/141
(58) Field of Classification Search
USPC ......................................................... 349/141
See application file for complete search history.

(56) References Cited

FOREIGN PATENT DOCUMENTS

| JP | 2002244158 A | * | 8/2002 |
| JP | 2009-181092 | | 8/2009 |
| JP | 2009181092 A | * | 8/2009 |

* cited by examiner

*Primary Examiner* — Edward Glick
*Assistant Examiner* — Anthony G Quash
(74) *Attorney, Agent, or Firm* — Antonelli, Terry, Stout & Kraus, LLP.

(57) ABSTRACT

Provided is a liquid crystal display device that includes a liquid crystal layer sandwiched between two substrates, one of which includes a pixel electrode and a common electrode, where the electrode that is disposed closer to the liquid crystal layer has a stripe pattern that includes a plurality of slip electrode portions, and each of the plurality of slip electrode portions includes a curved portion at which each of the plurality of the slip electrode portions changes a stretching direction, and where the other electrode has a solid flat shape provided with a plurality of openings at locations that overlap with the curved portions of the plurality of slip electrode portions, the plurality of openings being provided in a manner that makes the opening in one curved portion independent and that allows only a convex outline segment of the slip electrode portion to run through an area of the opening.

4 Claims, 15 Drawing Sheets

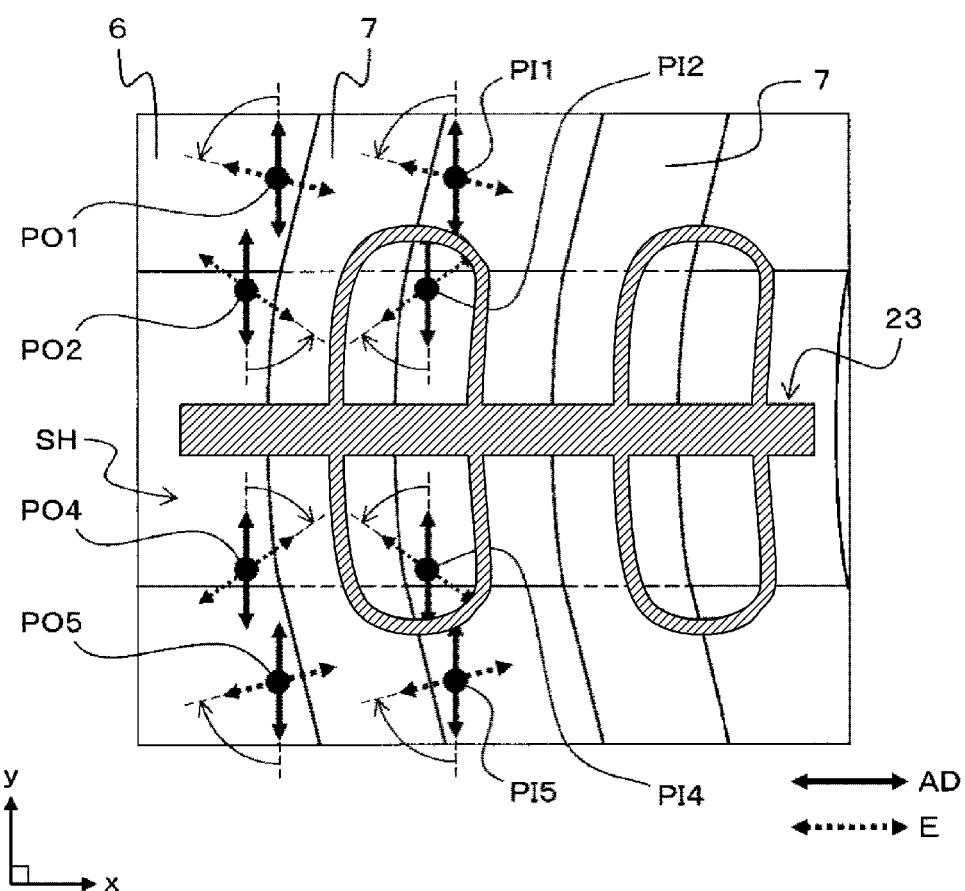

LIQUID CRYSTAL DISPLAY DEVICE HAVING A PLURALITY OF SLIP ELECTRODE PORTIONS WITH CURVED PORTIONS THAT ARE OVERLAPPED BY A PLURALITY OF OPENINGS

CROSS-REFERENCE TO RELATED APPLICATION

The present application claims priority from Japanese patent application JP 2010-054613 filed on Mar. 11, 2010, the content of which is hereby incorporated by reference into this application.

BACKGROUND OF THE INVENTION

1. Field of the Invention

The present invention relates to a liquid crystal display device and, in particular, a technology effectively applied to lateral electric field drive type liquid crystal display devices.

2. Description of the Related Art

In liquid crystal display devices that are mounted to cell phones, digital cameras, and the like, in recent years, resolution is increasing (the number of pixels is increasing) progressively and the areal dimensions per pixel tend to decrease accordingly. Further, the demand for high image quality is still strong in those liquid crystal display devices. Therefore, those liquid crystal display devices are required to balance high image quality and high pixel count. Major factors that give a liquid crystal display device high image quality are brightness, contrast ratio, and viewing angle characteristics.

An in-plane switching (IPS) liquid crystal display device includes a liquid crystal display panel including, in each pixel, an electrode that is characterized by being shaped in a stripe pattern in plan view, and drives a liquid crystal layer by applying an electric field whose major components are parallel to the substrate plane (so-called lateral electric field) to the liquid crystal layer. The liquid crystal layer in the IPS liquid crystal display panel has a homogeneous alignment, and an application of a lateral electric field causes an alignment change in which liquid crystal molecules rotate within the plane of the liquid crystal layer. The IPS liquid crystal display panel therefore has excellent display characteristics in terms of viewing angle.

When a lateral electric field is applied to the liquid crystal layer having a homogeneous alignment, there are two possible rotation directions, clockwise and counter-clockwise, for the liquid crystal molecules. Generally, when the liquid crystal molecules rotate, a rotation direction that requires a smaller rotation angle to be parallel to the electric field direction is chosen. Therefore, in the IPS liquid crystal display device, the liquid crystal molecules can be prompted to rotate in one of the two possible directions by setting the direction of the electrode stripes (electric field direction) and the initial alignment direction of the liquid crystal layer suitably.

In some recent IPS liquid crystal display panels, an area that exhibits a clockwise alignment change (hereinafter, referred to as clockwise area) and an area that exhibits a counter-clockwise alignment change (hereinafter, referred to as counter-clockwise area) are formed within a single pixel by, for example, setting two electrode stripe directions within a single pixel. A liquid crystal display device that includes this type of liquid crystal display panel is even more improved in tone reproduction in the viewing angle direction.

IPS liquid crystal display panels include ones called IPS provectus (IPS-Pro) liquid crystal display panels in which a pixel electrode and a common electrode are disposed in different layers, and one of the pixel electrode and the common electrode that is disposed closer to a liquid crystal layer than the other electrode is has a stripe-patterned shape in plan view, whereas the other electrode that is disposed farther from the liquid crystal layer than the one electrode is has a solid flat shape in plan view. IPS-Pro liquid crystal display devices have higher transmittance and are capable of brighter display compared to, for example, IPS liquid crystal display devices which dispose a pixel electrode and a common electrode in the same layer. Liquid crystal display panels capable of color display commonly use a pixel that has a substantially rectangular shape in plan view. In those liquid crystal display panels, setting the stripe direction of a stripe-patterned electrode parallel to the longer sides of the pixel lessens the transmittance-lowering effect of a domain that is generated at an end of the electrode, and accordingly enhances the transmittance.

In other words, IPS-Pro liquid crystal display devices can have excellent viewing angle characteristics and high transmittance both by employing a pixel structure (planar shape) in which the stripe direction of the stripe-patterned electrode is set parallel to the direction of the longer sides of the pixel, and the stripe direction has two variations. A well known example of this pixel structure is a structure in which the longer sides of the pixel are bent into a boomerang shape (see JP 2009-181092 A, for example).

SUMMARY OF THE INVENTION

In the pixel structure in which the stripe direction of the stripe-patterned electrode is parallel to the longer sides of the pixel and the stripe direction is bent, a bent portion at which the stripe direction changes is the border between the clockwise area and the counter-clockwise area.

The pixel in an IPS liquid crystal display panel also sets an angle between the stripe direction of the electrode and the initial alignment direction of the liquid crystal layer as small as, for example, approximately 8 degrees in order to ensure that a change in the alignment of the liquid crystal layer which occurs when an electric field is applied is sufficiently large. In this case, the angle of the bent portion in the stripe-patterned electrode is an obtuse angle of 164 degrees by calculation. Further, the electrode is usually formed by etching a transparent conductive film and consequently has rounded corners. Those factors give a gently curved edge to the portion of an actually formed electrode where the stripe direction changes. In the following description, the portion where the stripe direction changes in a stripe-patterned electrode is referred to as a bent portion (or being bent) when the change is steep as observed in layout data or the like, and referred to as a curved portion (or being curved) when the change is gradual as observed in an actually formed electrode.

At the curved portion in the stripe-patterned electrode, a change in electric field direction (orientation) is as small as 16 degrees and the change is continuous, which makes the border between the clockwise area and the counter-clockwise area very unstable.

A liquid crystal display device is used in combination with, for example, a touch panel in some cases. The touch panel is disposed on top of a liquid crystal display panel, and therefore operating the touch panel applies depression pressure to the liquid crystal display panel. In a liquid crystal display device that is not used in combination with a touch panel, too, depression pressure is applied to a liquid crystal display panel of the liquid crystal display device sometimes, for example, when the liquid crystal display panel is touched with a finger or the like.

When an external force such as depression pressure is applied to a liquid crystal display panel as in those cases, in pixels at and around the point of pressure application, the border between the clockwise area and the counter-clockwise area shifts position, and it takes long time period for the shifted border to return to the original position. A change in the areal ratio of the clockwise area and the counter-clockwise area, which have different viewing angle characteristics, within a single pixel changes the transmittance in the viewing angle direction. In short, a conventional liquid crystal display panel that has a curved, stripe-patterned electrode has a problem in that a positional shift of the border between the clockwise area and the counter-clockwise area causes a change in transmittance within a single pixel which is observed as a residual image.

The border between the clockwise area and the counter-clockwise area, where two different alignment changes of the liquid crystal layer are balanced and liquid crystal molecules therefore do not rotate, is displayed black on the screen. This gives rise to another problem in that, when the border makes a large positional shift and increases in length as a result, a change in transmittance is observed from the frontal direction as well.

As a way to steady the position of the border between the clockwise area and the counter-clockwise area, the first thing that comes to mind is a modification of the stripe structure, for example, a reduction of the angle of the curved portion through a local change in stripe direction in the curved portion. However, this reduces the amount of change in the alignment of the liquid crystal layer, which occurs when an electric field is applied, at and near the curved portion and thus lowers the transmittance.

Another possible method of steadying the position of the border between the clockwise area and the counter-clockwise area is, for example, to add an electrode that crosses (links) a plurality of curved portions lined along the border, thereby breaking up the electric field distribution at the curved portions. However, this equals to disposing ends of the stripe structure at the curved portions, and areas where an application of an electric field fails to rotate liquid crystal molecules (hereinafter, referred to as black screen display domains) are generated in the curved portions, thus lowering the transmittance.

In IPS-Pro liquid crystal display panels, the electrode having a solid flat shape is disposed in a layer separate from the layer that contains the stripe-patterned electrode. Providing a slit structure in the solid flat shape electrode has been practiced in recent liquid crystal display panels as an attempt to steady the border between the clockwise area and the counter-clockwise area. An example of this is disclosed in JP 2009-181092 A, where a slit structure is formed to cross a plurality of curved portions lined along the border. An adverse effect of providing a slit structure in the solid flat shape electrode is, for example, the generation of black screen display domains at the curved portions due to the slit structure, which lowers the transmittance.

In short, all of the pixel structures that have been considered up to now for an IPS liquid crystal display panel that includes a curved, stripe-patterned electrode have a problem in that reducing residual images which are generated when depression pressure is applied lowers the transmittance.

An object of the present invention is to provide a technology with which the reduction of residual images, which are generated when depression pressure is applied, and high transmittance can be both accomplished in, for example, a liquid crystal display device including an IPS liquid crystal display panel that has a curved, stripe-patterned electrode.

The aforementioned and other objects of the present invention as well as novel features of the present invention are clarified by a description given herein and by accompanying drawings.

A representative aspect of the present invention disclosed herein is outlined as follows.

According to the present invention, a liquid crystal display device includes a liquid crystal display panel that includes a liquid crystal layer sandwiched between a pair of substrates, the liquid crystal display panel having a display area which includes a plurality of pixels, the plurality of pixels each including a pixel electrode, a common electrode, and the liquid crystal layer, the liquid crystal layer having a homogeneous alignment as an alignment when an electric field generated by applying a voltage between the pixel electrode and the common electrode is not applied, the pixel electrode and the common electrode being stacked on top of each other on one of the pair of substrates with an insulating layer interposed between the pixel electrode and the common electrode, the pixel electrode and the common electrode differing from each other in distance from the liquid crystal layer, in which, of the pixel electrode and the common electrode, the electrode that is disposed closer to the liquid crystal layer than the other electrode has a stripe pattern that includes a plurality of slip electrode portions, and each of the plurality of slip electrode portions includes a curved portion at which each of the plurality of slip electrode portions changes a stretching direction, and in which, of the pixel electrode and the common electrode, the electrode that is disposed farther from the liquid crystal layer than the other electrode has a solid flat shape provided with a plurality of openings at locations that overlap with the curved portions of the plurality of slip electrode portions, the plurality of openings being provided in a manner that makes the opening in one curved portion independent of the opening in another curved portion and that allows only a convex outline segment of two outline segments of the slip electrode portion in each curved portion to run through an opening area.

According to the liquid crystal display device of the present invention, the reduction of residual images, which are generated when depression pressure is applied, and high transmittance can be both accomplished.

BRIEF DESCRIPTION OF THE DRAWINGS

In the accompanying drawings:

FIG. 16 is a schematic plan view illustrating an example of a change in liquid crystal molecule alignment around each curved portion of a common electrode in the liquid crystal display panel of Comparative Example.

DETAILED DESCRIPTION OF THE INVENTION

The present invention is described below in detail through embodiments (examples) with reference to the drawings.

Throughout the drawings illustrating Examples, components that have the same functions are denoted by the same reference symbols to avoid repetitive descriptions.

Example 1

FIGS. 1 to 5 are schematic diagrams illustrating a schematic structure of a liquid crystal display panel according to Example 1 of the present invention.

Figure 1:
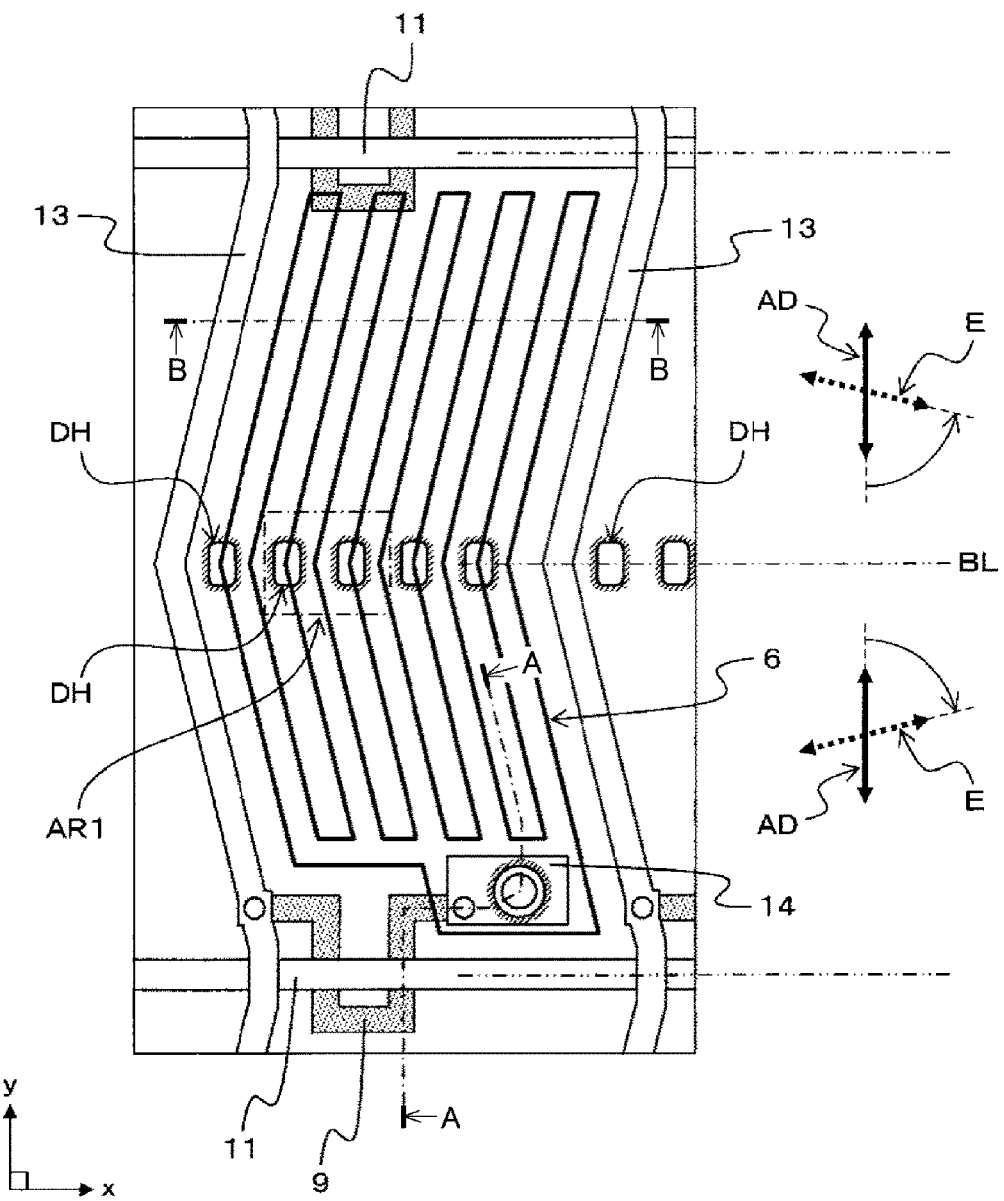
FIG. 1 is a schematic plan view illustrating an example of a planar structure of a pixel in a liquid crystal display panel according to Example 1 of the present invention.
Figure 2:
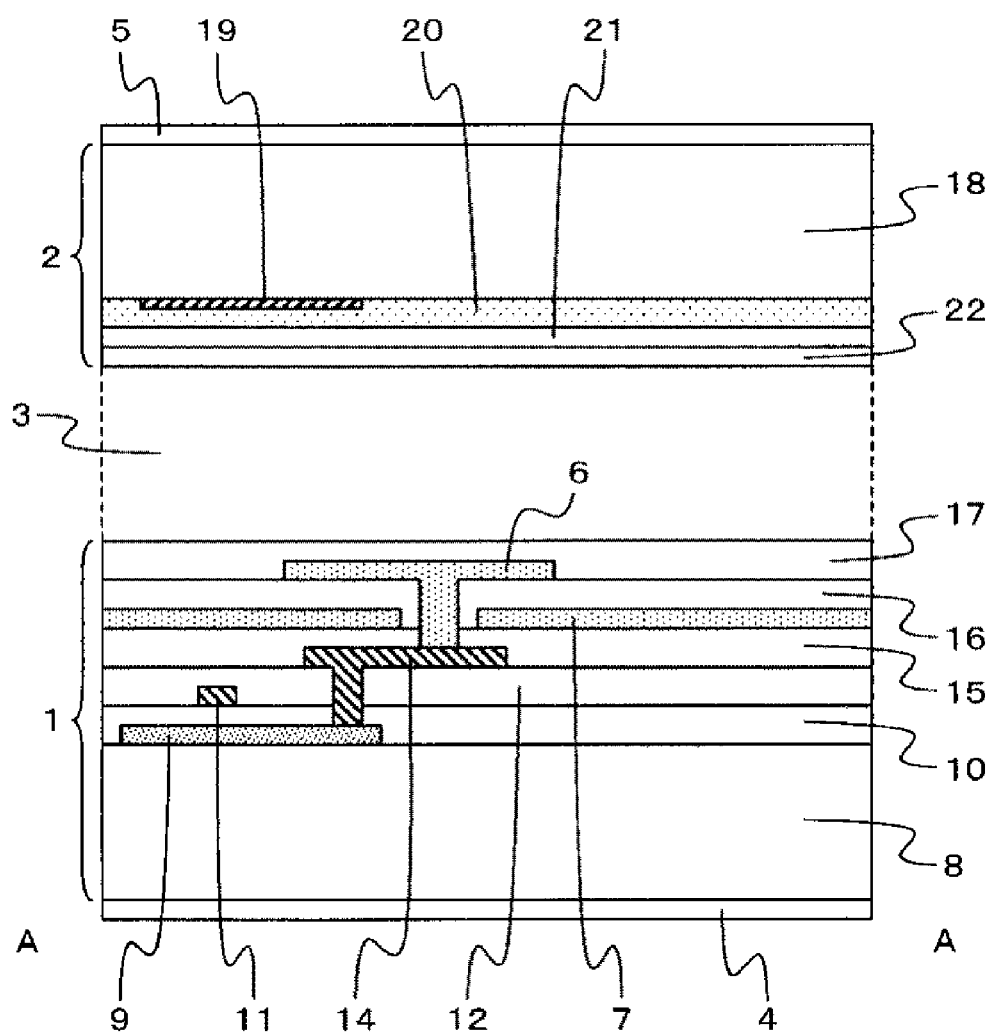
FIG. 2 is a schematic sectional view illustrating an example of a sectional structure taken along the line A-A of FIG. 1.
Figure 3:
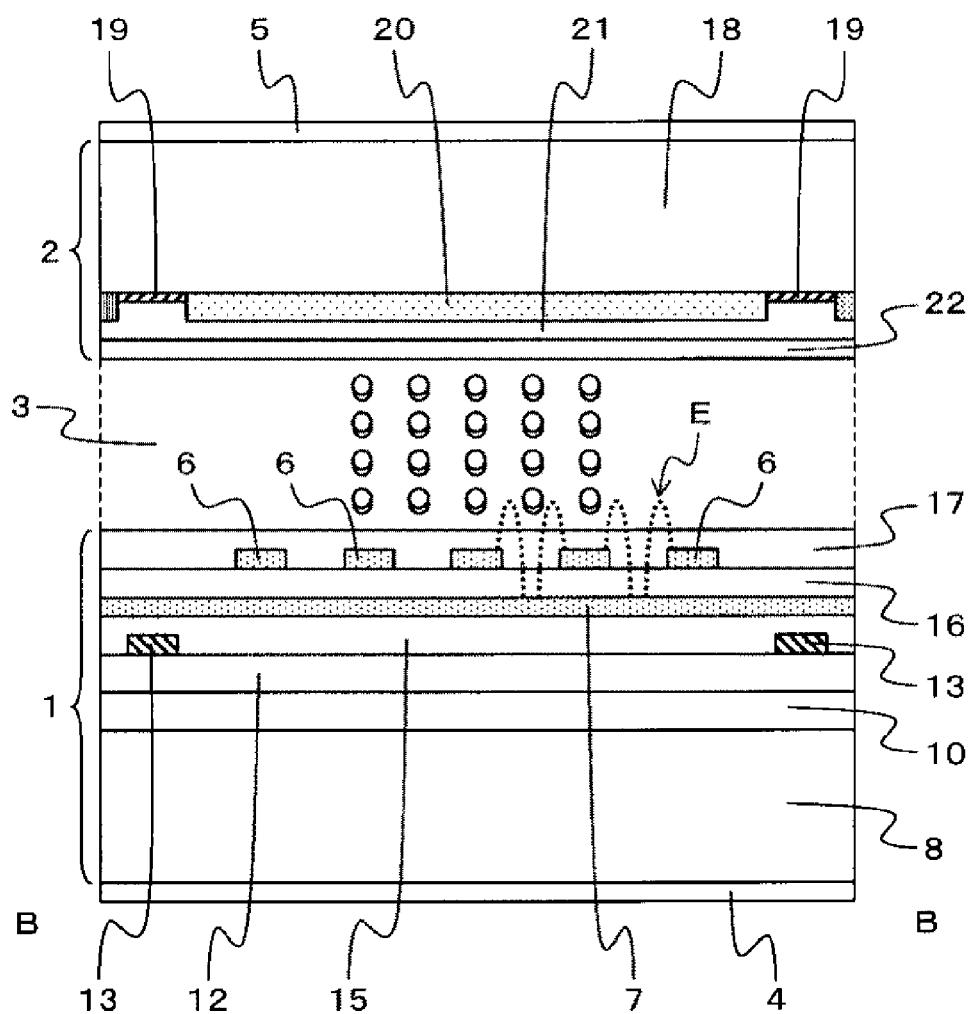
FIG. 3 is a schematic sectional view illustrating an example of a sectional structure taken along the line B-B of FIG. 1.
Figure 4:
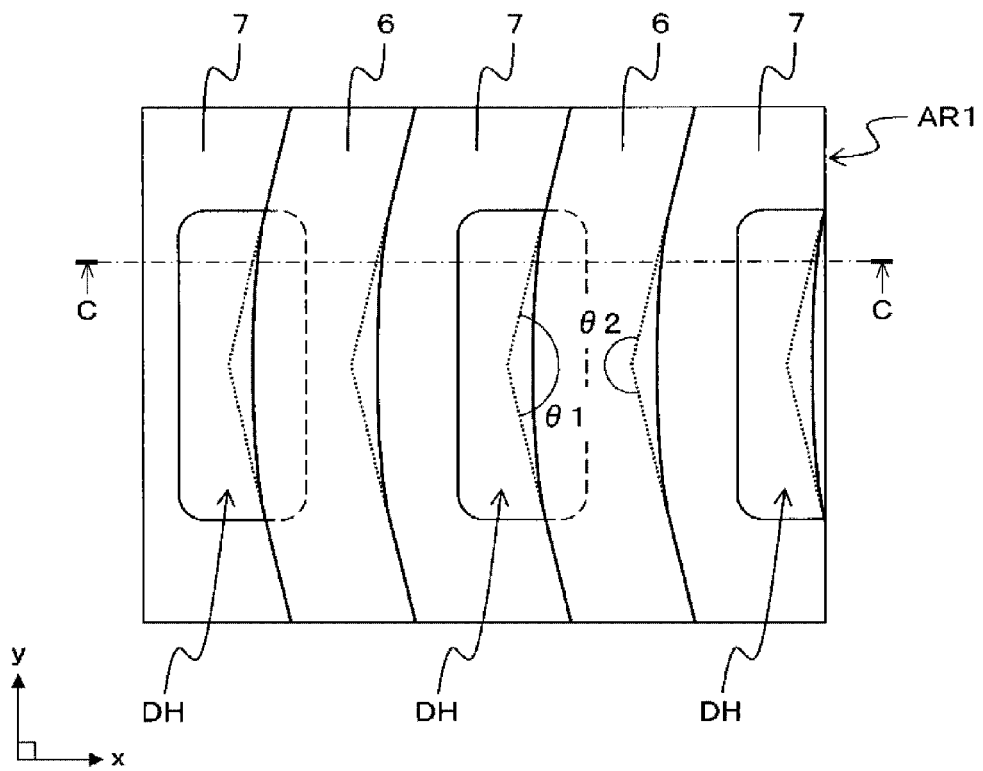
FIG. 4 is an enlarged schematic plan view of an area AR1 of FIG. 1.
Figure 5:
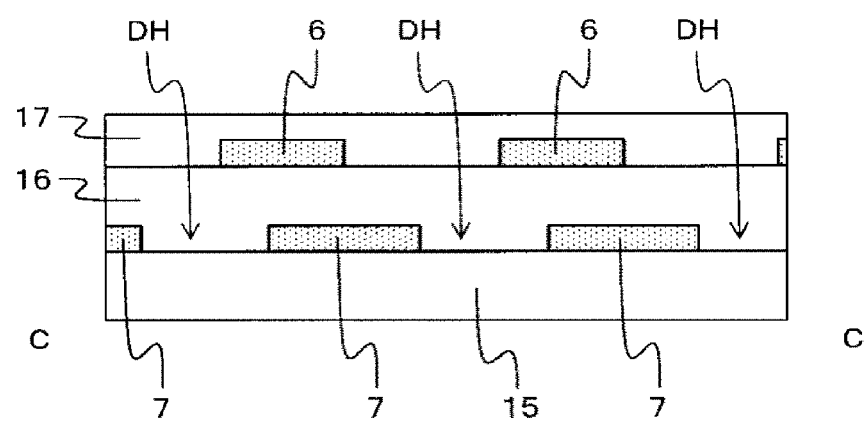
FIG. 5 is a schematic sectional view illustrating an example of a sectional structure taken along the line C-C of FIG. 4.

FIG. 1 is a schematic plan view illustrating an example of a planar structure of a pixel in the liquid crystal display panel according to Example 1 of the present invention. FIG. 2 is a schematic sectional view illustrating an example of a sectional structure taken along the line A-A of FIG. 1. FIG. 3 is a schematic sectional view illustrating an example of a sectional structure taken along the line B-B of FIG. 1. FIG. 4 is an enlarged schematic plan view of an area AR1 of FIG. 1. FIG. 5 is a schematic sectional view illustrating an example of a sectional structure taken along the line C-C of FIG. 4.

FIG. 5 illustrates only a part of the sectional structure of the liquid crystal display panel that contains a pixel electrode and a common electrode, which are the main focus of the present invention, and their surroundings.

The liquid crystal display panel of Example 1 includes, for example, a first substrate 1, a second substrate 2, a liquid crystal layer 3, a first polarizing plate 4, and a second polarizing plate 5 as illustrated in FIGS. 1 to 3. A pixel electrode 6 and a common electrode 7 which are for applying an electric field to the liquid crystal layer 3 are both provided in the first substrate 1.

The first substrate 1 is a substrate called a thin-film transistor (TFT) substrate or the like, and is formed of a first insulating substrate 8 and a first thin-film laminate formed on the first insulating substrate 8. The first thin-film laminate includes, in addition to the pixel electrode 6 and the common electrode 7, a TFT semiconductor layer 9, a first insulating layer 10, a scanning signal line 11, a second insulating layer 12, a video signal line 13, a source-drain electrode 14 of the TFT, a third insulating layer 15, a fourth insulating layer 16, a first alignment film 17, and others. The video signal line 13 and the source-drain electrode 14 in this Example are respectively connected to the semiconductor layer 9 via through holes. The pixel electrode 6 in this Example is connected to the source-drain electrode 14 via a through hole.

The pixel electrode 6 and the common electrode 7 are disposed to overlap with each other with the fourth insulating layer 16 interposed therebetween. The distance between the pixel electrode 6 and the liquid crystal layer 3 differs from the distance between the common electrode 7 and the liquid crystal layer 3. In Example 1, the pixel electrode 6 is disposed closer to the liquid crystal layer 3 than the common electrode 7 is. The pixel electrode 6 in this Example which is closer to the liquid crystal layer 3 is shaped in a stripe pattern (also referred to as interdigital pattern) in plan view, and a plurality of (five in FIG. 1) slip electrode portions are disposed side by side at given intervals across the central portion of the pixel. Each of the slip electrode portions stretches substantially in the longitudinal direction of the pixel (y-axis direction), and the stripe direction (stretching direction) thereof changes around the mid-point in the longitudinal direction as illustrated in FIG. 1. In the liquid crystal display panel of Example 1, the stretching direction of the video signal lines 13 is also curved to be parallel to the slip electrode portions of the pixel electrode 6 as illustrated in FIG. 1. The planar shape of a single pixel is therefore like a boomerang in which the longer sides of the pixel are curved.

The common electrode 7, which is disposed farther from the liquid crystal layer 3 than the pixel electrode 6 is, has in plan view a solid flat shape that stretches over a plurality of pixels. The common electrode 7 also has a contact opening, which is provided to overlaps with a connect portion of the pixel electrode 6 where the pixel electrode 6 is connected to the source-drain electrode 14 via the through hole, dot openings (dot holes) DH, which are provided at locations where the common electrode 7 overlaps with the curved portions of the pixel electrode 6, and others. The dot holes DH provided in the common electrode 7 are described later.

The second substrate 2 is a substrate that is called a counter substrate, a color filter (CF) substrate, or the like, and is formed of a second insulating substrate 18 and a second thin-film laminate formed on the second insulating substrate 18. The second thin-film laminate includes a black matrix 19, a color filter 20, a leveling film 21, and a second alignment film 22.

The pixel structure in the liquid crystal display panel of Example 1 is a structure well known in conventional IPS-Pro liquid crystal display panels, except the dot holes DH provided in the common electrode 7. Example 1 therefore omits detailed descriptions on the pixel structure and a method of manufacturing the liquid crystal display panel.

In the liquid crystal display panel of Example 1, the slip electrode portions in the stripe-patterned pixel electrode 6 are curved as described above. The curved portions of the respective slip electrode portions are disposed side by side in the direction of the shorter sides of the pixel (x-axis direction). The direction of an electric field E applied to the liquid crystal layer 3 differs above and below a border BL, which links those curved portions to one another. When the stripe direction of the slip electrode portions in a first area above the border BL and the stripe direction of the slip electrode portions in a second area below the border BL have a relation that gives the former and the latter an equal angle of tilt from the y-axis direction and opposing directions of tilt, the direction of the electric field E that is applied to the first area and the direction of the electric field E that is applied to the second area are equal with each other in the angle of tilt from the x-axis direction and opposite to each other in the direction of tilt. Accordingly, setting the longitudinal direction of the pixel (y-axis direction) in an initial alignment direction AD of the liquid crystal layer 3, i.e., the molecular axis direction (long axis direction) of liquid crystal molecules when no electric field E is applied, causes liquid crystal molecules in the first area to rotate counter-clockwise and liquid crystal molecules in the second area to rotate clockwise when their respective electric fields E are applied.

According to the uniaxial model, a change in the alignment of the liquid crystal layer 3 which occurs when an electric field is applied is approximated as the rotation of the alignment direction within the plane of the liquid crystal layer 3 that maintains the homogeneous alignment. In an orientation that contains the alignment direction, the retardation of the liquid crystal layer 3 decreases as the polar angle increases, and the screen display therefore tends to assume a bluish tint. In a direction perpendicular to this orientation, the retardation of the liquid crystal layer 3 increases as the polar angle increases, and the screen display therefore tends to assume a yellowish tint. In the case where two areas that have opposing liquid crystal molecule rotation directions are provided within a single pixel as illustrated in FIG. 1, the tinting tendencies described above are cancelled when viewed from a certain direction, and the resultant effect is that the viewing angle characteristics are improved.

In the liquid crystal display panel of Example 1, the dot holes DH are provided in the common electrode 7 having a solid flat shape at locations that overlap with the curved portions of the pixel electrode 6 (slip electrode portions) as described above. The dot holes DH are provided, for example, in the manner illustrated in FIGS. 4 and 5, where the dot hole DH in one curved portion is independent of the dot hole DH in another curved portion, and, of the two outline segments (two edges) of the slip electrode portion in each curved portion, only the convex outline segment runs through the dot hole area in plan view. The convex outline segment in Example 1 is an outline segment on the side of an inner angle θ1, which is the smaller of inner angles θ1 and θ2 of each curved portion of the pixel electrode 6 (slip electrode portions). The portions where the stretching direction of the pixel electrode 6 (slip electrode portions) changes exhibit a steep change in layout data created by computer-aided design (CAD) or the like, as indicated by the dotted lines of FIG. 4, and exhibit a gradual, curved change in the actually formed pixel electrode 6, as indicated by the solid lines of FIG. 4. The portions where the stretching direction of the pixel electrode 6 (slip electrode portions) changes are curved presumably because of, for example, stray light in exposure which is executed in the process of forming the pixel electrode 6, and the permeation of an etchant during etching. In other words, the portions where the stretching direction of the pixel electrode 6 (slip electrode portions) changes are curved inevitably in the process of forming the pixel electrode 6.

Figure 6:
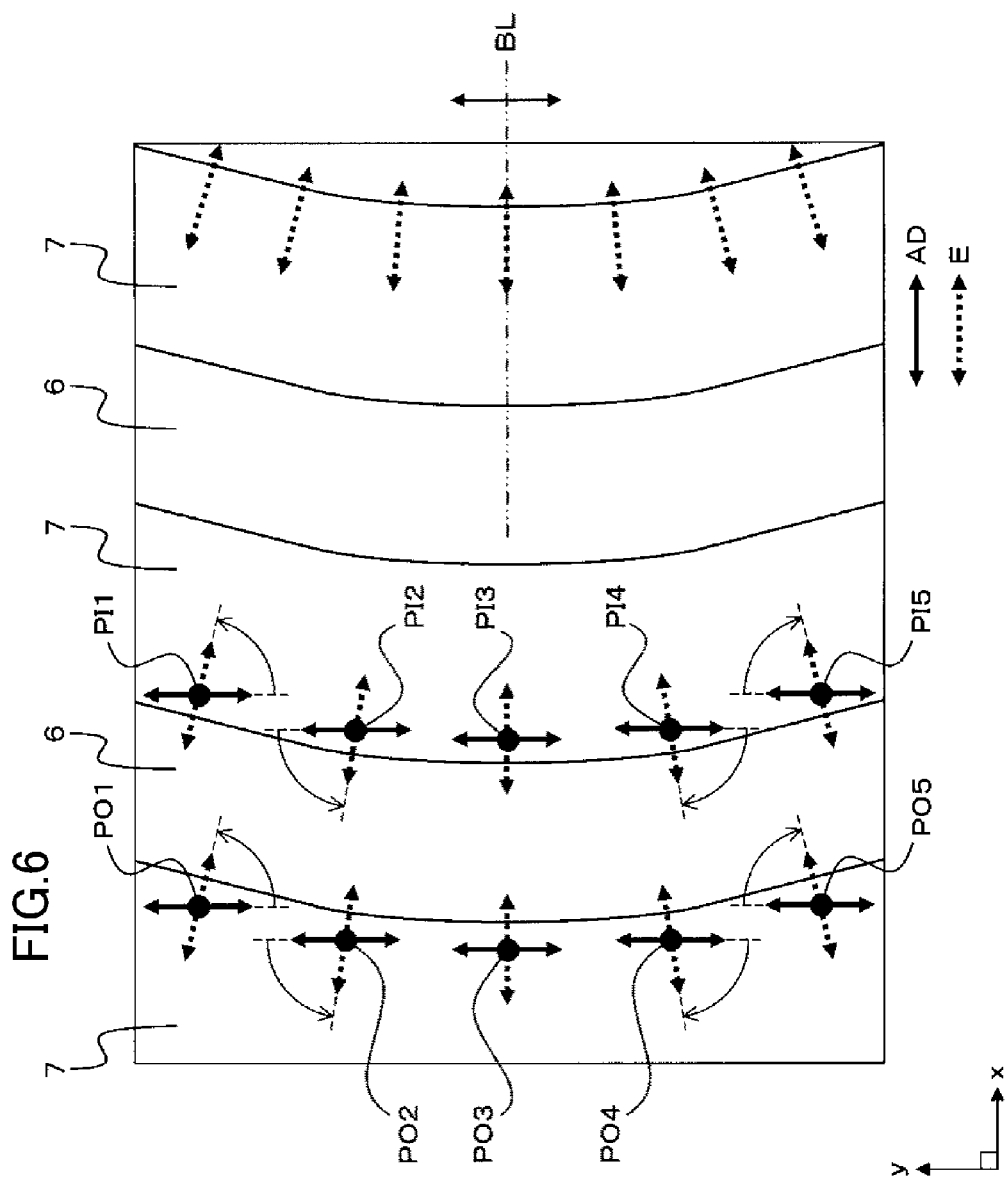
FIG. 6 is a schematic plan view illustrating an example of a change in liquid crystal molecule alignment around each curved portion of a pixel electrode in a conventional liquid crystal display panel.
Figure 7:
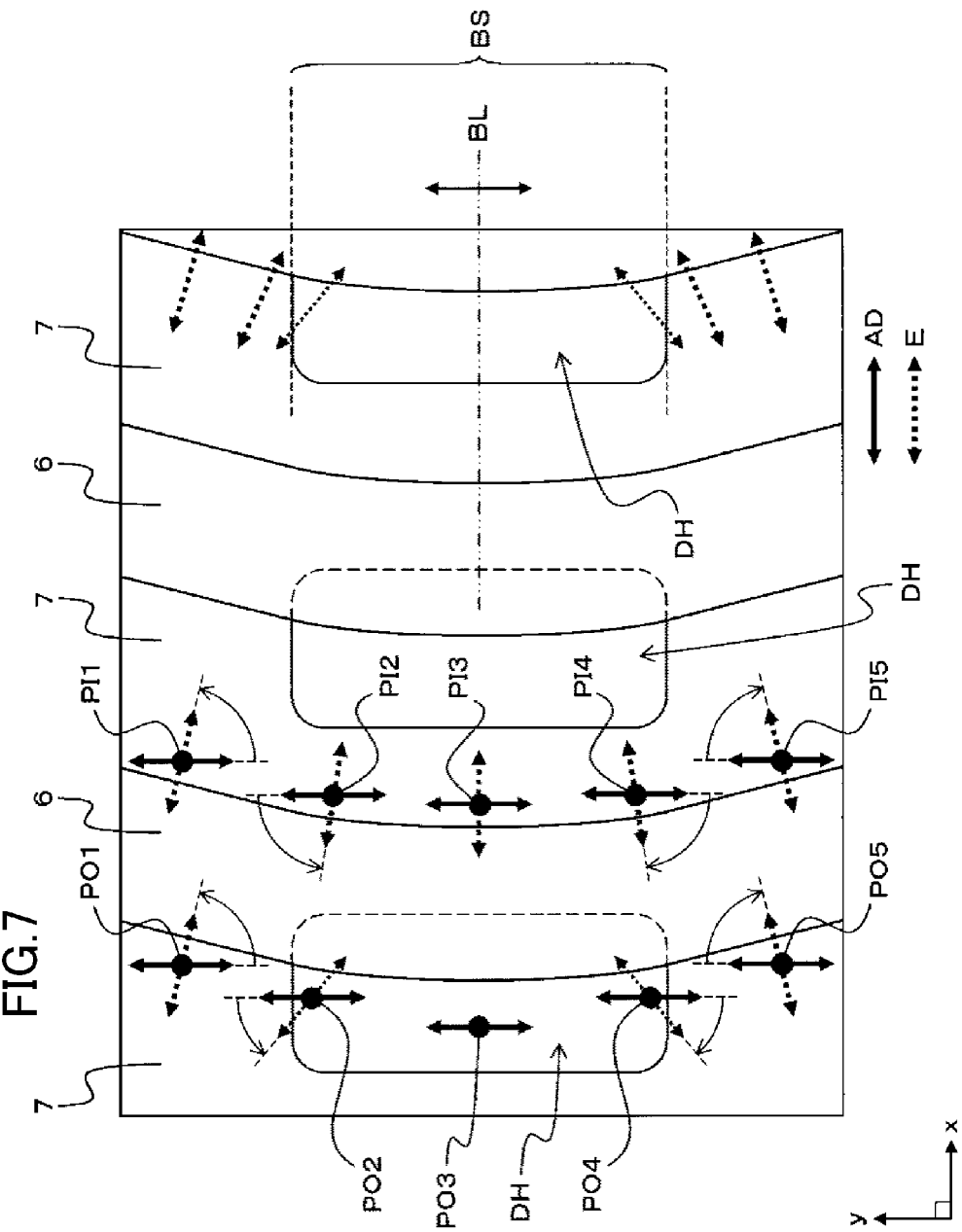
FIG. 7 is a schematic plan view illustrating an example of a change in liquid crystal molecule alignment around each curved portion of a pixel electrode in the liquid crystal display panel of Example 1.

FIGS. 6 and 7 are schematic diagrams illustrating effects of the liquid crystal display panel of Example 1.

FIG. 6 is a schematic plan view illustrating an example of a change in liquid crystal molecule alignment around each curved portion of a pixel electrode in a conventional liquid crystal display panel. FIG. 7 is a schematic plan view illustrating an example of a change in liquid crystal molecule alignment around each curved portion of the pixel electrode in the liquid crystal display panel of Example 1.

In FIGS. 6 and 7, the direction of the double-pointed arrows in thick solid line points the initial alignment direction AD of liquid crystal molecules, and the direction of the double-pointed arrows in dotted line points the direction of the electric field E to be applied. FIGS. 6 and 7 also use the single-pointed arrows in thin solid line (excluding the leader lines that connect components and reference symbols) to point a direction in which liquid crystal molecules rotate when the electric field E is applied.

To describe the effects of the liquid crystal display panel of Example 1, how the alignment of liquid crystal molecules changes around a curved portion when no dot hole DH is provided in the common electrode 7 is described first with reference to FIG. 6.

When no dot hole H is provided in the common electrode 7, applying a voltage between the pixel electrode 6 and the common electrode 7 causes an application of an electric field that is directed, for example, as illustrated in FIG. 6 around each curved portion of the pixel electrode 6 (slip electrode portions).

First, at points PO1, PO2, PO3, PO4, and PO5 along the convex one of the two outline segments of the slip electrode portion in the curved portion, the electric field E that is directed perpendicular to this convex outline segment is applied. In the case where the convex outline segment is curved gently, a section in which the direction of the electric field E is substantially orthogonal to the initial alignment direction AD is generated at, for example, the point PO3. The rotation direction of liquid crystal molecules therefore settles in neither the clockwise direction nor the counter-clockwise direction at and around the point PO3.

Similarly, at points PI1, PI2, PI3, PI4, and PI5 along the concave one of the two outline segments of the slip electrode portion in the curved portion, the electric field E that is directed substantially perpendicular to this concave outline segment is applied. When the concave outline segment is curved gently, a section in which the direction of the electric field E is substantially orthogonal to the initial alignment direction AD is accordingly generated at, for example, the point PI3. The rotation direction of liquid crystal molecules therefore settles in neither the clockwise direction nor the counter-clockwise direction at and around the point PI3, too.

In addition, when no dot hole DH is provided, the direction of the electric field E along the outline segments of the slip electrode portion in the curved portion changes in a continuous manner. With this pixel structure, a positional shift of the border BL between the first area (counter-clockwise area) and the second area (clockwise area) therefore happens too easily.

In contrast, when the dot holes DH are provided in the common electrode 7 as in Example 1, the direction of the electric field applied around each curved portion of the pixel electrode 6 (slip electrode portions) when a voltage is applied between the pixel electrode 6 and the common electrode 7 is, for example, as illustrated in FIG. 7.

In Example 1, the direction of the electric field E at the points PI1, PI2, PI3, PI4, and PI5 along the concave one of the two outline segments of the slip electrode portion in the curved portion is substantially perpendicular to this concave outline segment as in the conventional IPS-Pro liquid crystal display panel. It is therefore presumed that, in the liquid crystal display panel of Example 1, too, the rotation direction of liquid crystal molecules settles in neither the clockwise direction nor the counter-clockwise direction at and around the point PI13.

However, at the points PO1, PO2, PO3, PO4, and PO5 along the convex one of the two outline segments of the slip electrode portion in the curved portion, namely, the outline segment that runs above the dot hole DH of the common electrode 7, no electric field E is applied at and near the point PO3 at which the pixel electrode 6 (slip electrode portions) changes the stretching direction, owing to the presence of the dot hole DH. At the points PO2 and PO4, which are located near the outline of the dot hole DH (hole edges), the direction of the electric field E is not perpendicular to the convex outline segment. The direction of the electric field E at the point PO2 located above the point PO3 and the direction of the electric field E at the point PO4 located below the point PO3 are opposite to each other in terms of the rotation direction on the acute angle side from the x-axis. At the points PO2 and PO4 each, an angle between the direction of the electric field E and the x-axis direction is larger than the angle between the direction of the electric field E and the x-axis direction at the points PO1 and PO5, respectively. Liquid crystal molecules therefore rotate counter-clockwise at the point PO2, and rotate clockwise at the point PO4.

The liquid crystal layer 3 locally behaves as an elastic body. Therefore, when liquid crystal molecules rotate counter-clockwise at the point PO2, the rotation prompts liquid crystal molecules at the point PI2, which is located along the concave outline segment in the x-axis direction with respect to the point PO2, to rotate counter-clockwise. Similarly, when liquid crystal molecules rotate clockwise at the point PO4, the rotation prompts liquid crystal molecules at the point PI4, which is located along the concave outline segment in the x-axis direction with respect to the point PO4, to rotate clockwise. In short, the dot hole DH has an effect in that the position of the border BL between the first area (counter-clockwise area) and the second area (clockwise area) is steadied, thereby localizing the border BL in a section BS which is sandwiched between two edges of the dot hole DH in the y-axis direction.

A liquid crystal display device including the liquid crystal display panel of Example 1 was fabricated, and depression pressure was applied to the liquid crystal display panel to find out that no residual image was generated. The liquid crystal display device was also tested by disposing a touch panel on the liquid crystal display panel and operating the touch panel with a finger and a stylus (pen-shaped operating tool). The track of the finger or the stylus did not leave a residual image.

It had been presumed that, in the liquid crystal display device including the liquid crystal display panel of Example 1, black display screen domains are generated above the dot holes DH when the liquid crystal display device is in a white screen display mode. However, the transmittance of the liquid crystal display device measured was higher than in Comparative Example 1 described later in which a slit crossing a plurality of curved portions is provided.

As described above, the liquid crystal display device including the liquid crystal display panel of Example 1 can accomplish both the reduction of residual images, which are generated when depression pressure is applied, and high transmittance.

Needless to say, the liquid crystal display device including liquid crystal display panel of Example 1 also has excellent viewing angle characteristics.

Example 2

FIGS. 8 to 11 are schematic diagrams illustrating a schematic structure of a liquid crystal display panel according to Example 2 of the present invention.

Figure 8:
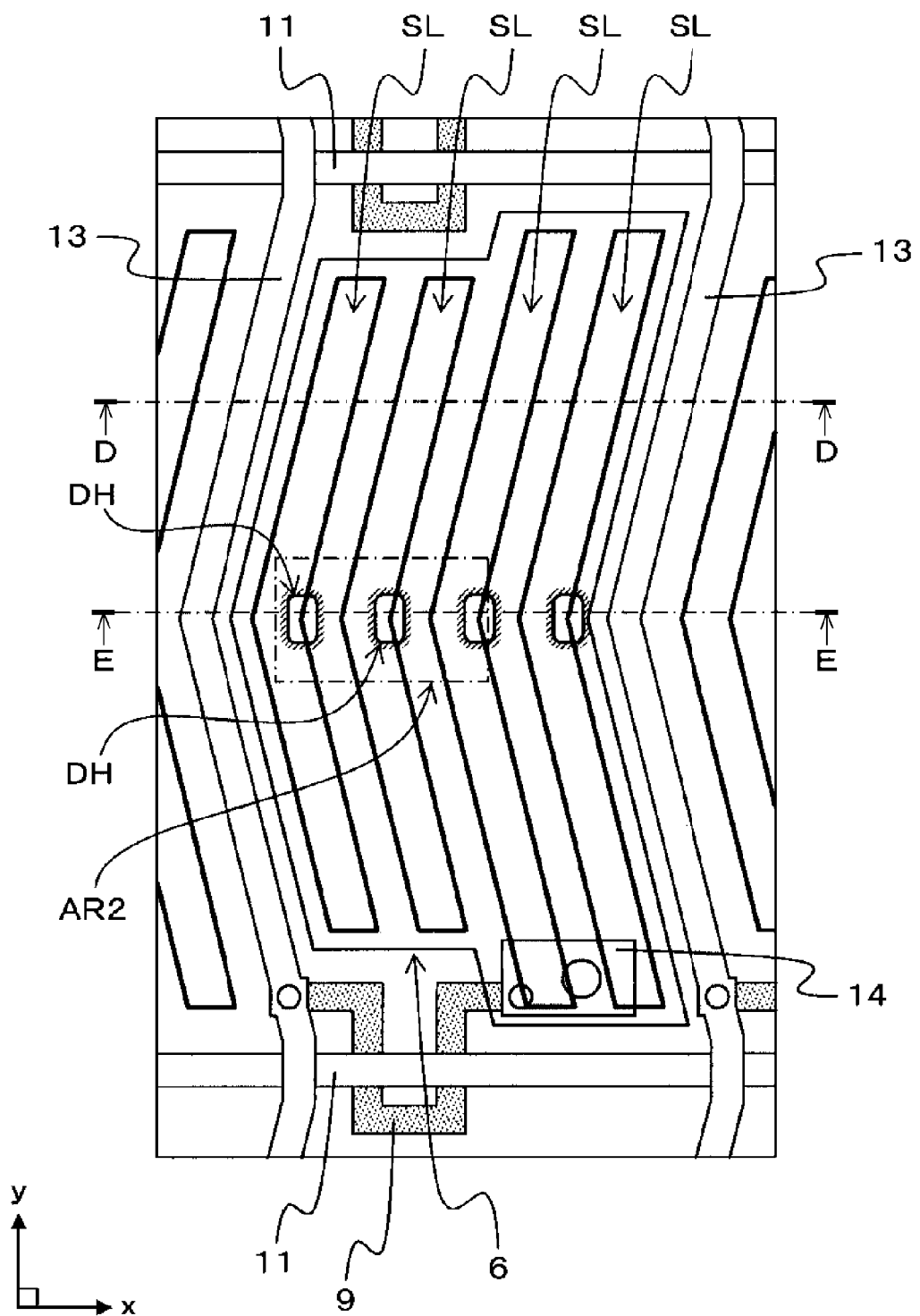
FIG. 8 is a schematic plan view illustrating an example of a planar structure of a pixel in a liquid crystal display panel according to Example 2 of the present invention.
Figure 9:
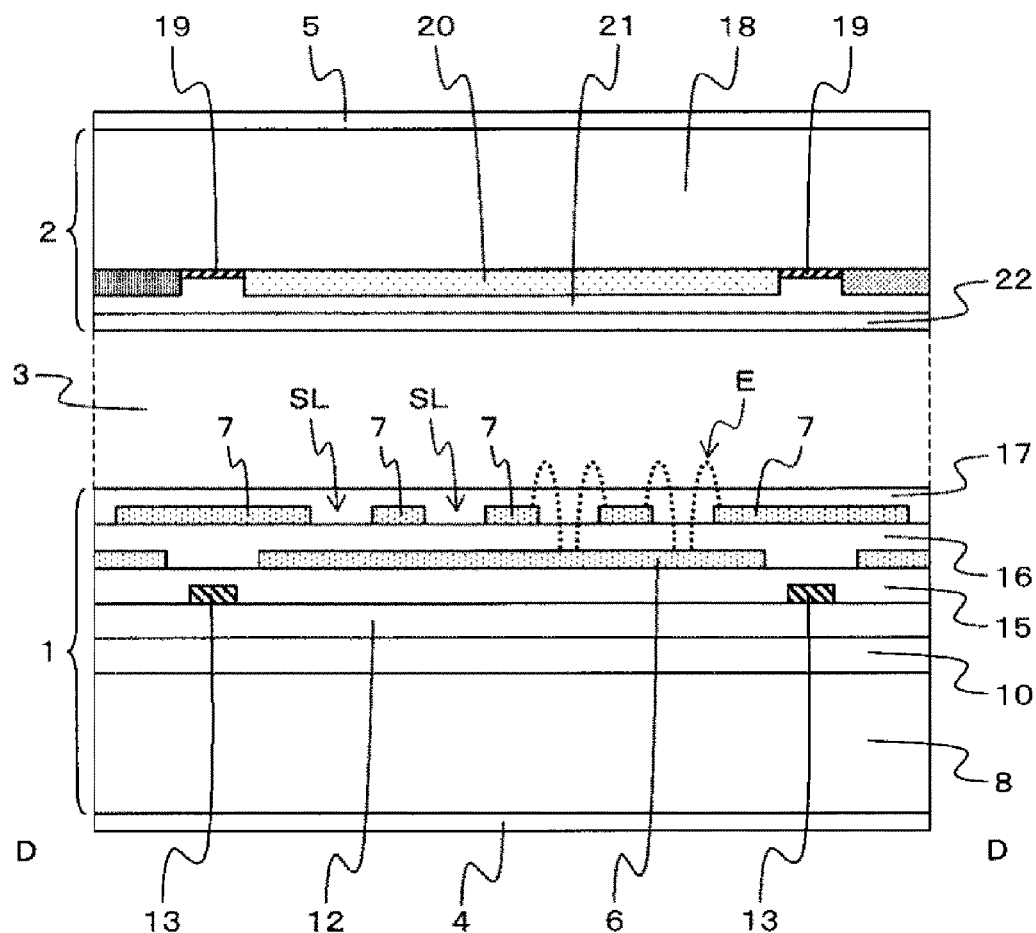
FIG. 9 is a schematic sectional view illustrating an example of a sectional structure taken along the line D-D of FIG. 8.
Figure 10:
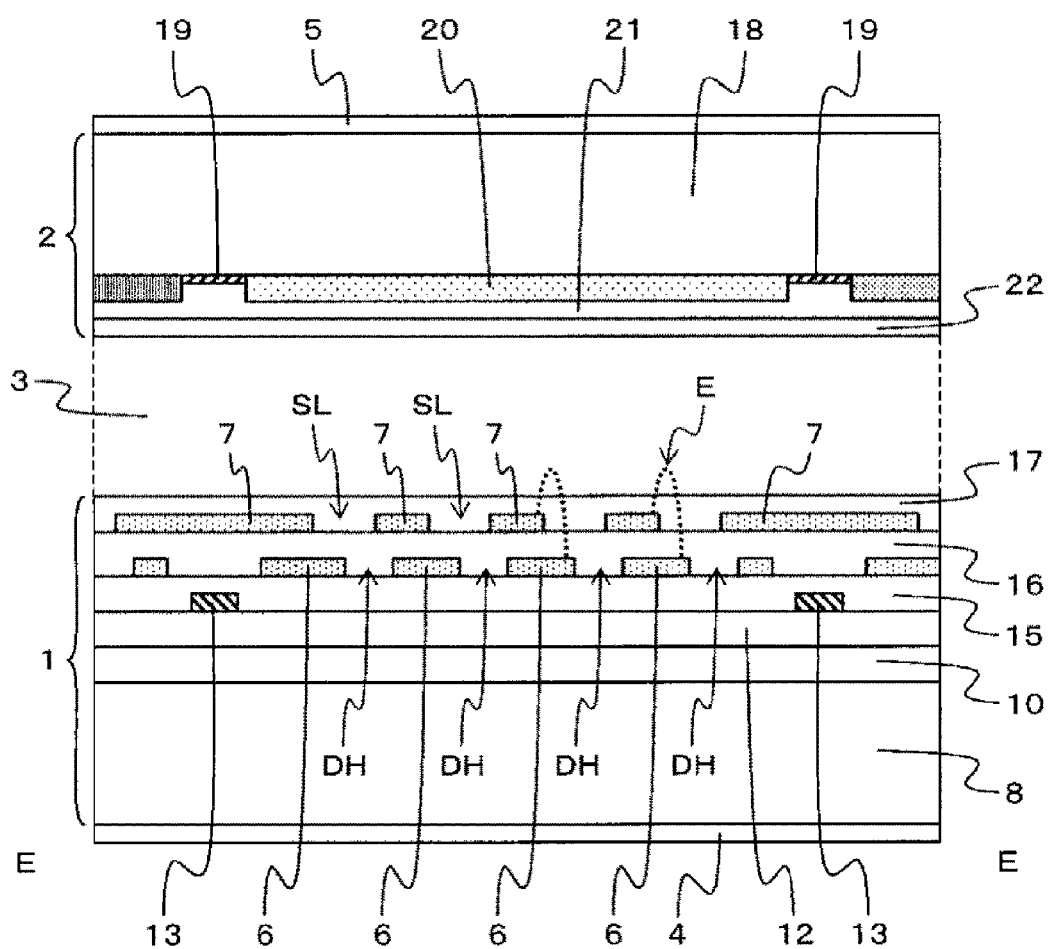
FIG. 10 is a schematic sectional view illustrating an example of a sectional structure taken along the line E-E of FIG. 8.
Figure 11:
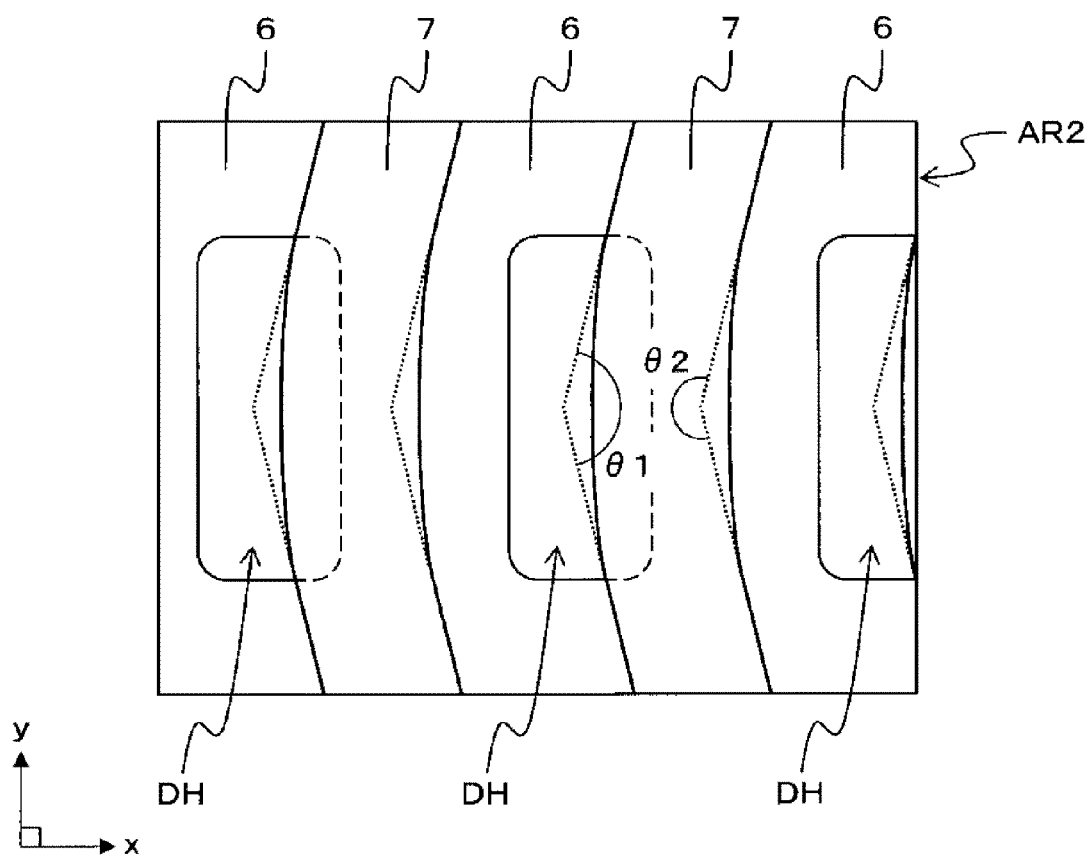
FIG. 11 is an enlarged schematic plan view of an area AR2 of FIG. 8.

FIG. 8 is a schematic plan view illustrating an example of a planar structure of a pixel in the liquid crystal display panel according to Example 2 of the present invention. FIG. 9 is a schematic sectional view illustrating an example of a sectional structure taken along the line D-D of FIG. 8. FIG. 10 is a schematic sectional view illustrating an example of the sectional structure taken along the line E-E of FIG. 8. FIG. 11 is an enlarged schematic plan view of an area AR2 of FIG. 8.

The liquid crystal display panel of Example 2 includes, for example, a first substrate 1, a second substrate 2, a liquid crystal layer 3, a first polarizing plate 4, and a second polarizing plate 5 as illustrated in FIGS. 8 to 10. A pixel electrode 6 and a common electrode 7 which are for applying an electric field to the liquid crystal layer 3 are both provided in the first substrate 1. In the liquid crystal display panel of Example 2, however, the common electrode 7 is disposed closer to the liquid crystal layer 3 than the pixel electrode 6 is.

In the case of the liquid crystal display panel of Example 2, the common electrode 7 disposed close to the liquid crystal layer 3 is shaped in a stripe pattern (also referred to as inter-digital pattern) in plan view, and slip electrode portions provided by forming a plurality of (four in FIG. 8) slits SL are disposed side by side at given intervals across the central portion of the pixel. As illustrated in FIG. 8, each of the slip electrode portions stretches substantially in the longitudinal direction of the pixel (y-axis direction), and the stripe direction thereof (stretching direction) changes around the midpoint in the longitudinal direction of the pixel (y-axis direction). Further, in the liquid crystal display panel of Example 2, the stretching direction of video signal lines 13 is also curved to be parallel to the slits SL (slip electrode portions) of the common electrode 7 as illustrated in FIG. 8. The planar shape of a single pixel is therefore like a boomerang in which the longer sides of the pixel are curved.

The pixel electrode 6, which is disposed farther from the liquid crystal layer 3 than the common electrode 7 is, has a solid flat shape in plan view, and has dot openings (dot holes) DH provided at locations where the pixel electrode 6 overlaps with the curved portions of the common electrode 7 (slip electrode portions).

The dot holes DH provided in the pixel electrode 6 are similar to the dot holes DH that are provided in the common electrode 7 in Example 1. The dot holes DH are provided, for example, in the manner illustrated in FIG. 11, which makes the dot hole DH in one curved portion independent of the dot hole DH in another curved portion, and which allows only the convex one of the two outline segments (two edges) of the slip electrode portion in each curved portion to run through the dot hole area in plan view. The convex outline segment in Example 2 is an outline segment on the side of an inner angle θ1, which is the smaller of inner angles θ1 and θ2 of each curved portion of the common electrode 7 (slip electrode portions). The portions where the stretching direction of the common electrode 7 (slip electrode portions) changes exhibit a steep change in layout data created by CAD or the like, as indicated by the dotted lines of FIG. 11, and exhibit a gradual, curved change in the actually formed common electrode 7, as indicated by the solid lines of FIG. 11. The portions where the stretching direction of the common electrode 7 (slip electrode portions) changes are curved inevitably in the process of forming the common electrode 7.

Figure 12:
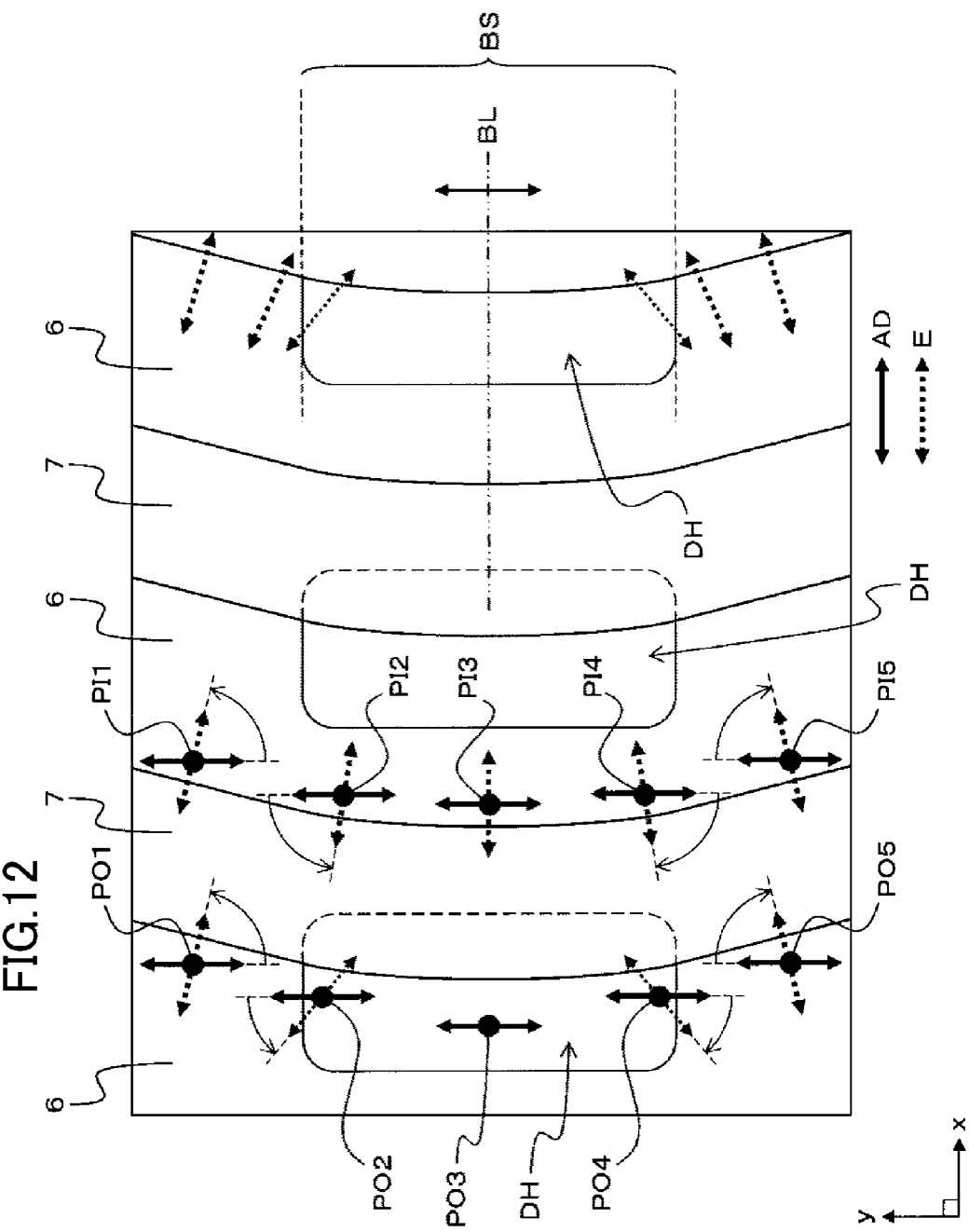
FIG. 12 is a schematic plan view illustrating an example of a change in liquid crystal molecule alignment around each curved portion of a common electrode in the liquid crystal display panel of Example 2.

FIG. 12 is a schematic plan view illustrating an example of a change in liquid crystal molecule alignment around each curved portion of the common electrode 7 in the liquid crystal display panel of Example 2.

In FIG. 12, the direction of the double-pointed arrows in thick solid line points an initial alignment direction AD of liquid crystal molecules, and the direction of the double-pointed arrows in dotted line points the direction of an electric field E to be applied. FIG. 12 also uses the single-pointed arrows in thin solid line (excluding the leader lines that connect components and reference symbols) to point a direction in which liquid crystal molecules rotate when the electric field E is applied.

Although the positional relation between the pixel electrode 6 and the common electrode 7 in the liquid crystal display panel of Example 2 is reverse to their positional relation in Example 1, the distribution of the electric field E generated when a voltage is applied between the pixel electrode 6 and the common electrode 7 is the same as in Example 1. Accordingly, in the case where the pixel electrode 6 is provided with no dot hole DH, the direction of the electric field E applied around each curved portion of the common electrode 7 (slip electrode portions) is, for example, as illustrated in FIG. 6. Remind that the pixel electrode 6 and the common electrode 7 of FIG. 6 are switched with each other as a comparative example of the liquid crystal display panel of Example 2.

This means that, in the case where the common electrode 7 is disposed closer to the liquid crystal layer 3 than the pixel electrode 6 is, too, a positional shift of the border BL between the first area (counter-clockwise area) and the second area (clockwise area) happens too easily unless the common electrode 7 (slip electrode portions) has curved portions and the dot holes DH are provided in the pixel electrode 6.

In contrast, in the liquid crystal display panel of Example 2, where points PO1, PO2, PO3, PO4, and PO5 are located along the convex one of the two outline segments of the slip electrode portion in each curved portion, namely, the outline segment that runs above the dot hole DH of the pixel electrode 6, as illustrated in FIG. 12, the presence of the dot hole DH ensures that no electric field E is applied at and around the point PO3 at which the common electrode 7 (slip electrode portions) changes the stretching direction. At the points PO2 and PO4, which are located near the outline of the dot hole DH (hole edges), the direction of the electric field E is not perpendicular to the convex outline segment. The direction of the electric field E at the point PO2 located above the point PO3 and the direction of the electric field E at the point PO4 located below the point PO3 are opposite to each other in terms of the rotation direction on the acute angle side from the x-axis. At the points PO2 and PO4 each, an angle between the direction of the electric field E and the x-axis direction is larger than the angle between the direction of the electric field E and the x-axis direction at the points PO1 and PO5, respectively. Liquid crystal molecules therefore rotate counter-clockwise at the point PO2, and rotate clockwise at the point PO4. The rotation at the point PO2 prompts liquid crystal molecules at the point PI2, which is located along the concave outline segment in the x-axis direction with respect to the point PO2, to rotate counter-clockwise, and the rotation at the point PO4 prompts liquid crystal molecules at the point PI4, which is located along the concave outline segment in the x-axis direction with respect to the point PO4, to rotate clockwise. In short, in the liquid crystal display panel of Example 2, too, the dot hole DH has an effect in that the position of the border BL between the first area (counter-clockwise area) and the second area (clockwise area) is steadied, thereby localizing the border BL in a section BS which is sandwiched between two edges of the dot hole DH in the y-axis direction.

It is therefore deduced that, in a liquid crystal display device including the liquid crystal display panel of Example 2, too, no residual image is generated when depression pressure is applied. It is also deduced that, when a touch panel is disposed on the liquid crystal display panel and operated with a finger and a stylus (pen-shaped operating tool), the track of the finger or the stylus does not leave a residual image.

It may be presumed that, in the liquid crystal display device including the liquid crystal display panel of Example 2, too, the transmittance of the liquid crystal display device measured in the white screen display mode is higher than in Comparative Example 1 described later in which the slit crossing the plurality of curved portions is provided.

As described above, the liquid crystal display device including the liquid crystal display panel of Example 2 can accomplish both the reduction of residual images, which are generated when depression pressure is applied, and high transmittance.

Needless to say, the liquid crystal display device including liquid crystal display panel of Example 2 also has excellent viewing angle characteristics.

Example 3

Figure 13:
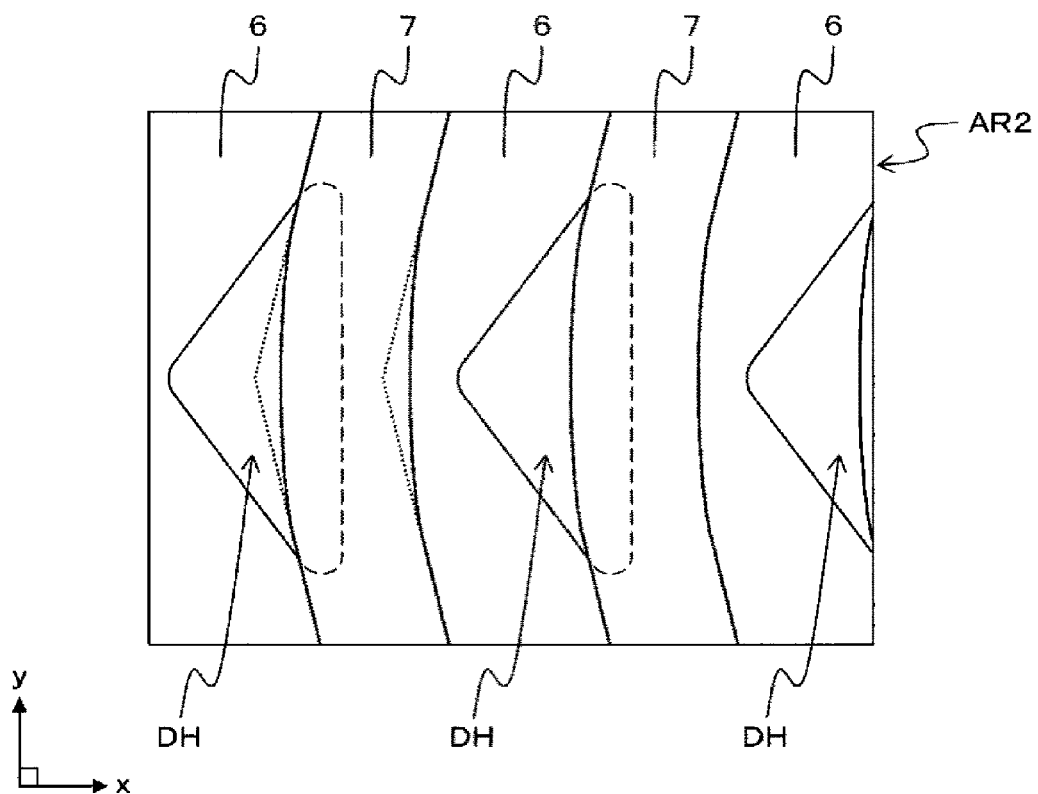
FIG. 13 is a schematic plan view illustrating an example of a planar structure of a dot opening (dot hole) in a liquid crystal display panel according to Example 3 of the present invention.

FIG. 13 is a schematic plan view illustrating an example of a planar structure of a dot opening (dot hole) in a liquid crystal display panel according to Example 3 of the present invention.

Example 3 describes a more desirable shape of the dot holes DH that are provided in the pixel electrode 6, based on the pixel structure of Example 2.

In the liquid crystal display panel of Example 3, the dot holes DH provided in the pixel electrode 6 each have, for example, a substantially isosceles triangle shape in plan view, and the base thereof runs below the curved portion of the common electrode 7 (slip electrode portions) as illustrated in FIG. 13. In this Example, too, the dot hole DH is provided in a manner that allows only the convex one of the two outline segments of the slip electrode portion in the curved portion of the common electrode 7 to run through the dot hole area in plan view.

Figure 14:
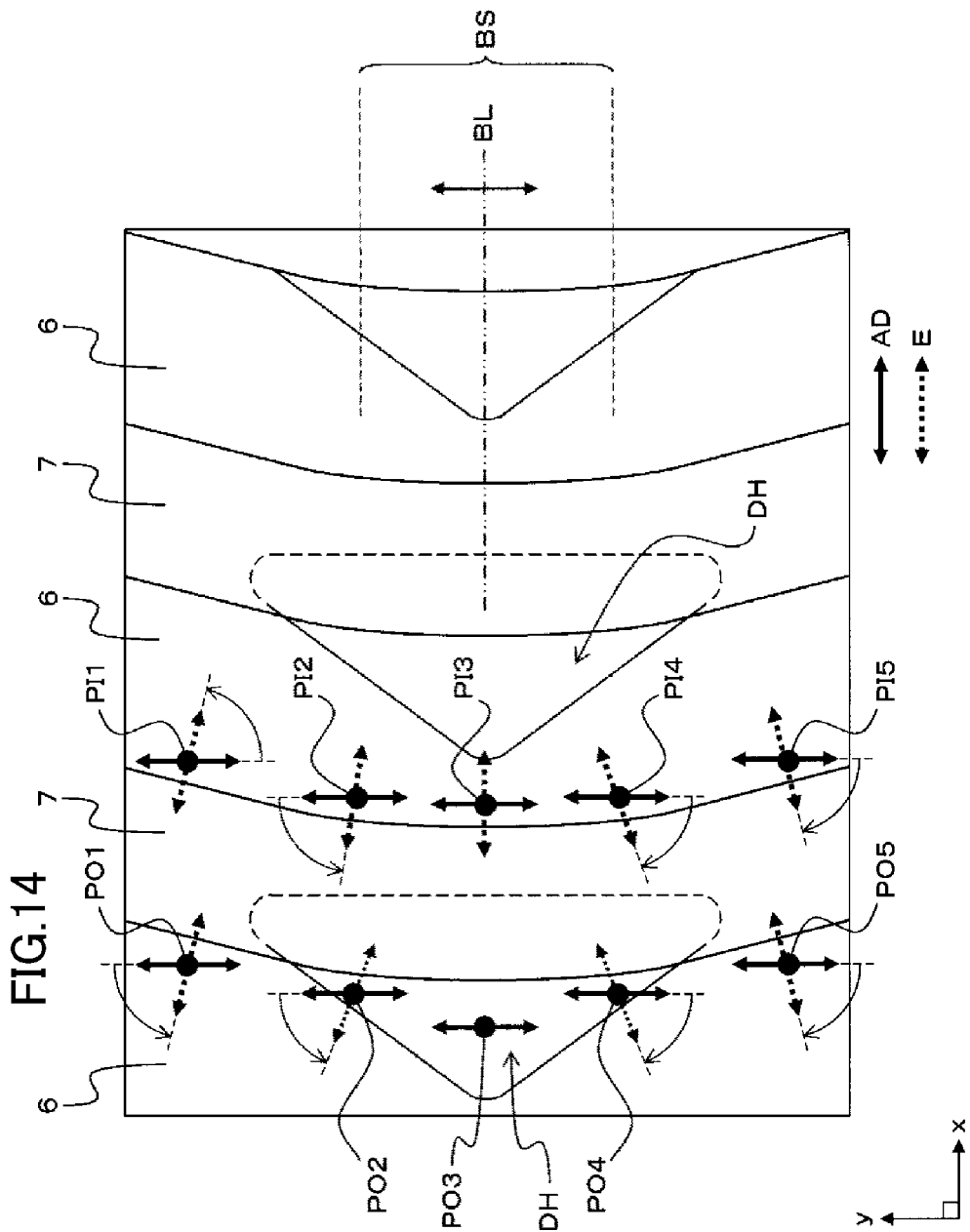
FIG. 14 is a schematic plan view illustrating an example of a change in liquid crystal molecule alignment around each curved portion of a common electrode in the liquid crystal display panel of Example 3.

FIG. 14 is a schematic plan view illustrating an example of a change in liquid crystal molecule alignment around each curved portion of the common electrode 7 in the liquid crystal display panel of Example 3.

In FIG. 14, the direction of the double-pointed arrows in thick solid line points an initial alignment direction AD of liquid crystal molecules, and the direction of the double-pointed arrows in dotted line points the direction of an electric field E to be applied. FIG. 14 also uses the single-pointed arrows in thin solid line (excluding the leader lines that connect components and reference symbols) to point a direction in which liquid crystal molecules rotate when the electric field E is applied.

In the case where the dot holes DH provided in the pixel electrode 6 each have a substantially isosceles triangle shape in plan view, too, as illustrated in FIG. 14, where points PO1, PO2, PO3, PO4, and PO5 are located along the convex one of the two outline segments of the slip electrode portion in each curved portion, namely, the outline segment that runs above the dot hole DH of the pixel electrode 6, the presence of the dot hole DH ensures that no electric field E is applied at and around the point PO3 at which the common electrode 7 (slip electrode portions) changes the stretching direction.

At the points PO2 and PO4, which are located near the outline of the dot hole DH (hole edges), because the dot hole DH is given a substantially isosceles triangle shape in plan view, the electric field intensity is higher than in Example 1 and Example 2, where each dot hole DH is substantially rectangular. Further, in the liquid crystal display panel of Example 3, an acute angle between the direction of the electric field E and the initial alignment direction AD of the liquid crystal layer 3 at the points PO2 and PO4 is larger than in the liquid crystal display panel of Example 2. It is therefore inferred that the rotation angle of liquid crystal molecules at the points PO2 and PO4 in the liquid crystal display panel of Example 3 is larger than in the liquid crystal display panel of Example 2. The liquid crystal display panel of Example 3 is accordingly concluded to be increased in the force of rotating liquid crystal molecules counter-clockwise at the point PI2, which is located in the x-axis direction with respect to the point PO2. The same applies to the points PO4 and PI4, which are located below the points PO3 and PI3, respectively, as illustrated in FIG. 14. In short, the liquid crystal display panel of Example 3 is very effective in steadying the position of the border BL between the first area (counter-clockwise area) and the second area (clockwise area).

A liquid crystal display device including the liquid crystal display panel of Example 3 was fabricated, and depression pressure was applied to the liquid crystal display panel to find out that no residual image was generated. The liquid crystal display device including the liquid crystal display panel of Example 3 was also found to be more stable against depression pressure, compared to the liquid crystal display device that includes the liquid crystal display panel of Example 1 or Example 2.

As described above, the liquid crystal display device including the liquid crystal display panel of Example 3 can accomplish both the reduction of residual images, which are generated when depression pressure is applied, and high transmittance.

Needless to say, the liquid crystal display device including liquid crystal display panel of Example 3 also has excellent viewing angle characteristics.

Comparative Example

Figure 15:
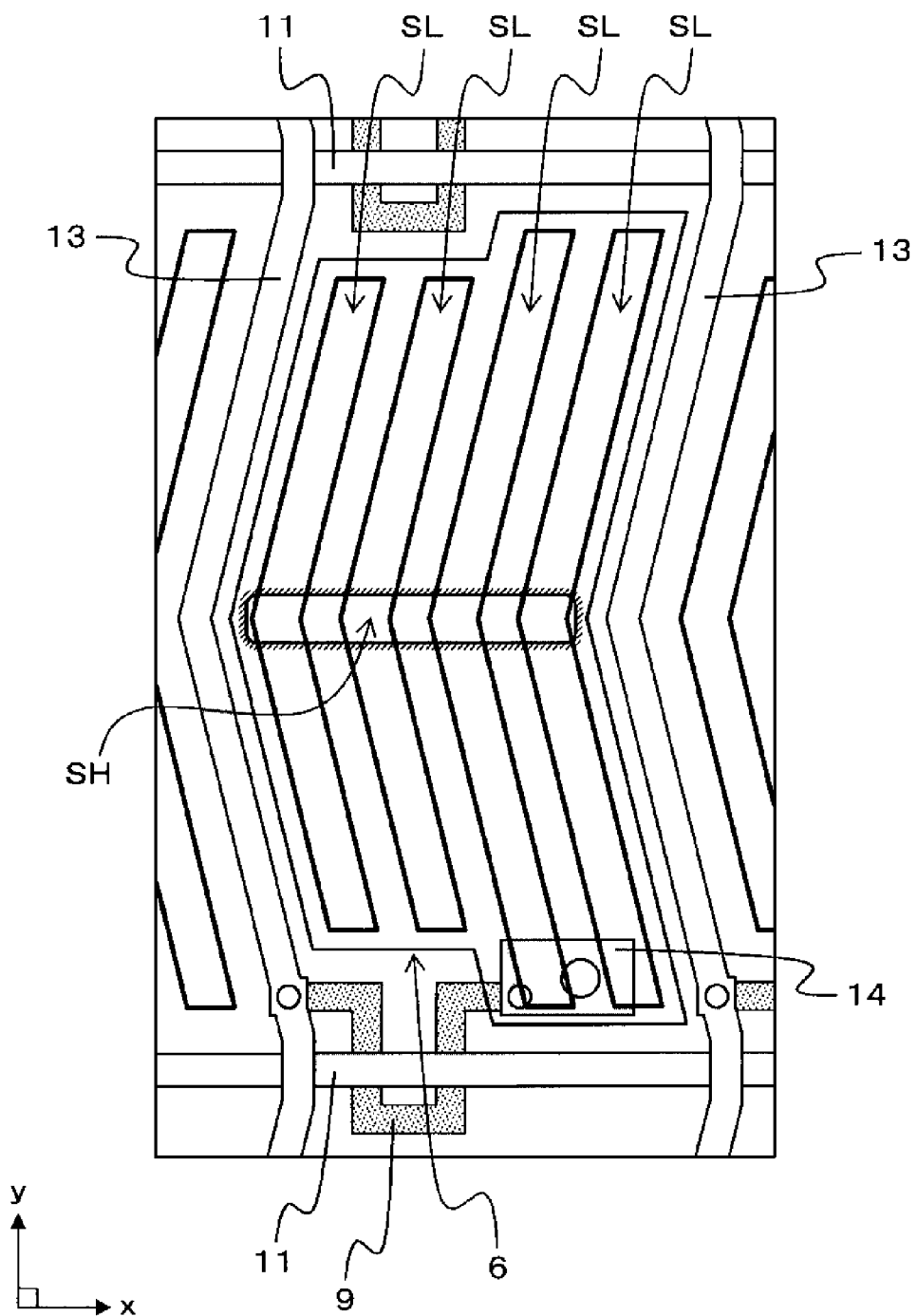
FIG. 15 is a schematic plan view illustrating an example of a planar structure of a pixel in a liquid crystal display panel according to Comparative Example which is related to the present invention.

FIG. 15 is a schematic plan view illustrating an example of a planar structure of a pixel in a liquid crystal display panel according to Comparative Example which is related to the present invention.

Lastly, Comparative Example is given to briefly describe the effect of providing the dot holes DH in curved portions of the pixel electrode 6 or the common electrode 7 in a manner that makes the dot hole DH in one curved portion independent of the dot hole DH in another curved portion, and that allows only the convex one of the two outline segments of the slip electrode portion in each curved portion to run above the dot hole DH in plan view as in Examples 1 to 3.

In the liquid crystal display panels of Example 2 and Example 3, a pixel is structured to dispose the pixel electrode 6 farther from the liquid crystal layer 3 than the common electrode 7 is and to curve slits (slip electrode portions) of the common electrode 7. One of the known methods of steadying the position of the border BL between the first area (counter-clockwise area) and the second area (clockwise area) in this pixel structure is illustrated in FIG. 15, where a slit opening (slit hole) SH which crosses a plurality of curved portions of the common electrode 7 in plan view is provided in the pixel electrode 6 (see JP 2009-181092 A, for example).

However, with the slit hole SH provided in the pixel electrode 6 in this manner, the electric field E directed, for example, as illustrated in FIG. 16 is applied around each curved portion of the common electrode 7 (slip electrode portions).

FIG. 16 is a schematic plan view illustrating an example of a change in liquid crystal molecule alignment around each curved portion of the common electrode in the liquid crystal display panel of Comparative Example.

In FIG. 16, the direction of the double-pointed arrows in thick solid line points an initial alignment direction AD of liquid crystal molecules, and the direction of the double-pointed arrows in dotted line points the direction of the electric field E to be applied. FIG. 16 also uses the single-pointed arrows in thin solid line (excluding the leader lines that connect components and reference symbols) to point a direction in which liquid crystal molecules rotate when the electric field E is applied.

In the case where the slit hole SH is provided in the pixel electrode 6, the direction of the electric field E at points PO1, PO2, PO4, and PO5, which are located along the convex one of the two outline segments of the slip electrode portion in each curved portion is the same as in Example 2, where the substantially rectangular dot holes DH are provided. In FIG. 16, liquid crystal molecules at the point PO2 and liquid crystal molecules in the point PO4 rotate in opposing directions.

Among points PI1, PI2, PI4, and PI5, which are located along the concave one of the two outline segments of the slip electrode portion in each curved portion, the direction of the electric field E at the points PI1 and PI5 is the same as in Example 2, where the substantially rectangular dot holes DH are provided.

However, among the points PI1, PI2, PI4, and PI5, which are located along the concave one of the two outline segments of the slip electrode portion in each curved portion, the direction of the electric field E at the points PI2 and PI4 is significantly tilted from a direction perpendicular to the concave outline segment because of the fact that the slit hole SH crosses a plurality of curved portions.

This causes liquid crystal molecules at the point PI2 and liquid crystal molecules at the point PI4 to rotate in opposing directions. Liquid crystal molecules at the point PI1 and liquid crystal molecules at the point PI2 also rotate in opposing directions. Further, liquid crystal molecules at the point PI4 and liquid crystal molecules at the point PI5 rotate in opposing directions.

As described above, an area that fails to rotate liquid crystal molecules and accordingly is displayed black on the screen (black screen display domain) is generated between two points at which liquid crystal molecules rotate in opposing directions when the electric field E is applied. Consequently, a thick black screen display domain 23 is generated at the border BL between the first area (counter-clockwise area) and the second area (clockwise area) in a liquid crystal display device that includes the liquid crystal display panel of Comparative Example, although the position of the border BL is highly stable in Comparative Example. It is therefore concluded that the liquid crystal display device including the liquid crystal display panel of Comparative Example is not capable of accomplishing the reduction of residual images and high transmittance both at the same time. In other words, to accomplish the reduction of residual images and high transmittance both, the dot holes DH need to be provided in a manner that makes the dot hole DH in one curved portion independent of the dot hole DH in another curved portion and that allows only the convex one of the two outline segments of the slip electrode portion in each curved portion to run through the dot hole area in plan view, as described in Examples 1 to 3.

A concrete description of the present invention has been given through Examples described above. However, the present invention is not limited to Examples and various modifications can be made without departing from the spirit of the present invention.

For instance, while Examples 1 to 3 discuss a case in which each single slip electrode portion in the pixel electrode 6 or the common electrode 7 has one curved portion, the present invention is not limited thereto and each single slip electrode portion can have two or more curved portions. In this case, too, as described above, both the reduction of residual images and high transmittance are accomplished by providing the solid flat shape electrode which is disposed far from the liquid crystal layer 3 with the dot holes DH in a manner that makes the dot hole DH in one curved portion independent of the dot hole DH in another curved portion and that allows only the convex one of the two outline segments of the slip electrode portion in each curved portion to run through the dot hole area in plan view.

The planar shape of the dot holes DH provided in the solid flat shape electrode which is disposed far from the liquid crystal layer 3 is not limited to the substantially rectangular shape and substantially isosceles triangle shape described above, and can be a polygonal shape such as a hexagonal shape.

The liquid crystal display panels discussed in Examples 1 to 3 are of transmissive type. However, the present invention is not limited thereto and is applicable to liquid crystal display panels called a reflective type and liquid crystal display panels called a transflective type.

The TFT disposed in the pixels of FIGS. 1, 2, and 8 has a structure in which the semiconductor layer 9 is disposed between the first insulating substrate 8 and the scanning signal line 11 (gate electrode) and the semiconductor layer 9 overlaps with one gate electrode in two areas. However, the present invention is not limited to this TFT structure, and may employ a structure in which the semiconductor layer 9 is disposed above the scanning signal lines 11 (gate electrodes) when viewed from the first insulating substrate 8.

Examples 1 to 3 discuss a case in which the slip electrode portions in the stripe-patterned electrode, which is closer to the liquid crystal layer 3 than the other electrode is, stretch substantially in the longitudinal direction of each pixel. However, the stretching direction of the slip electrode portions is not limited thereto, and may be substantially in the direction of the shorter sides of the pixel. In the case where the slip electrode portions stretch substantially in the shorter side direction of the pixel, too, when the slip electrode portions are respectively curved in a manner that puts the first area (counter-clockwise area) and the second area (clockwise area) side by side in the left-to-right direction within a single pixel, the position of the border between the two areas is easily unsteadied. In a pixel structured as this, providing the dot holes DH that are described in Examples 1 to 3 in the solid flat shape electrode, which is disposed farther from the liquid crystal layer 3 than the other electrode is, steadies the position of the border between the first area (counter-clockwise area) and the second area (clockwise area) within a single pixel.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising a liquid crystal display panel that comprises a liquid crystal layer sandwiched between a pair of substrates,
    the liquid crystal display panel having a display area which comprises a plurality of pixels, the plurality of pixels each comprising a pixel electrode, a common electrode, and the liquid crystal layer,
    the liquid crystal layer having a homogeneous alignment as an alignment when an electric field generated by applying a voltage between the pixel electrode and the common electrode is not applied,
    the pixel electrode and the common electrode being stacked on top of each other on one of the pair of substrates with an insulating layer interposed between the pixel electrode and the common electrode, the pixel electrode and the common electrode differing from each other in distance from the liquid crystal layer,
    wherein, of the pixel electrode and the common electrode, the electrode that is disposed closer to the liquid crystal layer than the other electrode has a stripe pattern that comprises a plurality of slip electrode portions, and each of the plurality of slip electrode portions comprises a curved portion at which each of the plurality of slip electrode portions changes a stretching direction, and
    wherein, of the pixel electrode and the common electrode, the electrode that is disposed farther from the liquid crystal layer than the other electrode has a solid flat shape provided with a plurality of openings at locations that overlap with curved portions of the plurality of slip electrode portions, the plurality of openings being provided in a manner that makes the opening in one curved portion independent of the opening in another curved portion and that allows only a convex outline segment of two outline segments of the slip electrode portion in each curved portion to run through an area of the opening in plan view.

2. The liquid crystal display device according to claim 1, wherein each of the plurality of openings has a planar shape which is substantially a triangle, and one of three sides of the triangle runs below the curved portion that is associated with the opening.

3. The liquid crystal display device according to claim 1, wherein each of the plurality of openings has a planar shape which is substantially an isosceles triangle, and a base of the isosceles triangle runs below the curved portion that is associated with the opening and is substantially parallel to a direction of the alignment of the liquid crystal layer when the electric field is not applied.

4. The liquid crystal display device according to claim 1, wherein each of the plurality of pixels has in plan view a substantially rectangular shape in which longer sides are curved, and the stretching direction of each of the plurality of slip electrode portions is parallel to the longer sides of each of the plurality of pixels.

* * * * *